US008740029B2

(12) United States Patent  
Barnoski et al.

(10) Patent No.: US 8,740,029 B2
(45) Date of Patent: Jun. 3, 2014

(54) DETERMINISTIC CLEAVE OF OPTICAL FIBER

(75) Inventors: Michael K. Barnoski, Pacific Palisades, CA (US); Suresh T. Gulati, Elmira, NY (US); King-Fu Hii, Camarillo, CA (US); Donald Keck, Big Flats, NY (US); William R. Powell, Horseheads, NY (US); R. Ryan Vallance, Newbury Park, CA (US)

(73) Assignee: Nanoprecision Products, Inc., El Segundo, CA (US)

( * ) Notice: Subject to any disclaimer, the term of this patent is extended or adjusted under 35 U.S.C. 154(b) by 297 days.

(21) Appl. No.: 13/171,435

(22) Filed: Jun. 28, 2011

(65) Prior Publication Data

US 2012/0000956 A1    Jan. 5, 2012

Related U.S. Application Data

(60) Provisional application No. 61/359,327, filed on Jun. 28, 2010.

(51) Int. Cl.
  *B26F 3/00*    (2006.01)

(52) U.S. Cl.
  USPC ............... 225/2; 225/96; 225/96.5; 83/913

(58) Field of Classification Search
  USPC ................ 225/2, 3, 96.5, 103, 96; 83/913
  See application file for complete search history.

(56) References Cited

U.S. PATENT DOCUMENTS

| | | | | |
|---|---|---|---|---|
| 4,216,004 A * | 8/1980 | Brehm et al. | ...................... | 225/2 |
| 4,413,763 A | 11/1983 | Lukas | | |
| 4,502,620 A * | 3/1985 | Leiby | ................................ | 225/2 |
| 4,552,290 A * | 11/1985 | Szostak | ............................. | 225/2 |
| 5,104,021 A * | 4/1992 | Seike et al. | ........................ | 225/2 |
| 5,108,021 A * | 4/1992 | Vines | ................................ | 225/2 |
| 5,829,659 A * | 11/1998 | Mansfield et al. | ................. | 225/2 |
| 5,838,850 A * | 11/1998 | Mansfield et al. | .............. | 385/31 |
| 6,099,392 A * | 8/2000 | Wiegand et al. | ................ | 451/41 |
| 6,186,384 B1 * | 2/2001 | Sawada | ............................. | 225/2 |
| 7,204,400 B2 * | 4/2007 | Marek et al. | ....................... | 225/1 |
| 2009/0103870 A1 | 4/2009 | Solomon et al. | | |

FOREIGN PATENT DOCUMENTS

| | | |
|---|---|---|
| GB | 1594007 | 7/1981 |
| JP | 54128885 | 10/1979 |

OTHER PUBLICATIONS

International Search Report of Counterpart PCT App. No. PCT/US2011/042256.

* cited by examiner

*Primary Examiner* — Omar Flores Sanches
(74) *Attorney, Agent, or Firm* — Liu & Liu

(57) ABSTRACT

Axial tension is applied to an optical fiber that had been scored at the intended cleave location, wherein the axial tension is applied in a time-varying manner to maintain the stress intensity factor for crack on the fiber within an acceptable level to produce a stable crack growth at a reasonable rate to cleave the fiber without requiring polishing of the end surface. Careful control of the applied tension force with time acts to control the velocity of the propagating crack by maintaining substantially constant stress intensity factor. The applied axial tension force is reduced with time and/or crack growth (as crack propagates). As a result, the strain energy in the fiber material is released by formation of a single plane with an optical quality surface without requiring polishing. A substantially flat optical surface of enhanced optical quality is formed at the cleaved end of the optical fiber.

20 Claims, 3 Drawing Sheets

(A)

(B)

DETERMINISTIC CLEAVE OF OPTICAL FIBER

PRIORITY CLAIM

This application claims the priority of U.S. Provisional Patent Application No. 61/359,327 filed on Jun. 28, 2010, which is fully incorporated by reference as if fully set forth herein. All publications noted below are fully incorporated by reference as if fully set forth herein.

BACKGROUND OF THE INVENTION

1. Field of the Invention

The present invention relates to optical fibers, in particular cleaving of optical fibers to shorten their length and produce a flat end on the fiber.

2. Description of Related Art

There are many advantages to transmitting light energy via optical fiber waveguides and the use thereof is diverse. Single or multiple fiber waveguides may be used simply for transmitting visible light to a remote location. Complex communication systems may transmit multiple specific optical signals. These devices often require the coupling of fibers in end-to-end relationship with the coupling representing a source of light loss. The cleaved end should be smooth and defect-free. If the ends of the fiber are uneven, excessive light loss can result due to reflection and refraction of light at the cleaved end surface (e.g., a splice or juncture region). For the vast majority of fiber optic applications, it is important to cleave the fiber such that the end of the fiber is completely flat in preparation for coupling. When placing optical fibers in end-to-end relationship, to minimize light loss, it is desirable to have the end faces of the fibers be smooth and lie in a plane perpendicular, or at a specific angle, to the axis of the fibers. In short, the cleaved fiber end face needs to be a single plane that is mirror quality to optimize coupling between fibers in demountable connectors, permanent splices and photonic devices.

Conventional cleaving is done by either use of mechanical cleaving or laser cleaving. Heretofore, according to one conventional mechanical cleaving approach to produce a cleave, the optical fiber is first placed under axial tension, and then the optical fiber is scored to initiate the cleave. The resulting cleave angle and surface features are a direct result of both the quality of the score and axial stress and/or strain distribution in the optical fiber. The axial tension applied is necessary to propagate the cleave. However, too much tension will cause the cleave to propagate too fast, creating hackle on the cleaved end. If too little tension is used, the scoring edge will be required to penetrate too deeply into the fiber to initiate the cleave, giving a poor cleave.

Given the imperfections created at the cleaved ends of the fibers, current cleaving approaches involve conventional cleaving of the optical fiber followed by mechanical polishing of the resultant end face to eliminate imperfections of the cleaved face non-planar form. An alternate approach is to use the above process but with mechanical polishing replaced by laser polishing. Such polishing step can be automated, but it requires elaborate and expensive equipment and a rather complex procedure, which limit the operation to being performed in a factory or laboratory. Furthermore, the shape of the fiber is distorted, often increasing in diameter, when the end of the fiber melts and resolidifies as a result of the laser polishing process.

Laser cleaving may produce either an end fiber surface that still requires further polishing to produce a flat cleaved surface, or an end surface that has been laser polished during the laser cleaving process. Laser cleaving produces a significantly better optical surface at the cleaved ends of fibers, but the process must be carried out using dedicated cleaving equipments (see, e.g., automated and fully integrated laser cleaving systems distributed by OpTek Systems; www.optek-systems.com).

The relatively widespread and ever increasing utilization of optical fibers in communication systems, data processing and other signal transmission systems has created a demand for satisfactory and efficient means of inter-joining terminals. Currently most demountable fiber connectors are factory installed. For field installation of optical fibers, it is particularly desirable to develop a process that can be simply and reliably deployed to properly cleave the optical fibers so as to minimize light loss when the fibers are subsequently coupled. There is a need to develop an effective, efficient and reliable approach to prepare optical fiber end faces.

SUMMARY OF THE INVENTION

The present invention provides a process that can be simply and reliably deployed to properly cleave optical fibers to obtain smooth ends, so as to minimize light loss when the fibers are subsequently coupled. The process in accordance with the present invention provides an effective, efficient and reliable approach to prepare optical fiber end faces without requiring polishing.

In accordance with one aspect of the present invention, axial tension is applied to an optical fiber that had been scored with an initial surface crack at the intended cleave location, wherein the applied axial tension is regulated to maintain the stress intensity factor for the crack to be within an acceptable level to produce a stable crack growth at a reasonable rate to cleave the fiber without requiring polishing of the end surface. More particularly, in one embodiment of the present invention, the basic approach is to score a groove into the optical fiber on its outside diameter either fully around the circumference of the fiber or in selective regions around the circumference, and then apply a time-varying force co-axial to the fiber longitudinal axis to cleave the fiber. The fiber may or may not be initially held under a substantially constant tension when it is being scored. A carefully controlled scoring process provides only an initial surface crack without sub-surface crack, which defines the location where crack propagation across the fiber will be initiated with sufficient axial tension. The score may be produced mechanically by a scoring tool, or a laser cut, or subjecting to other forms of ablation such as a focused ion beam. Applying a time varying force to the fiber causes the initial crack to propagate radially inward towards the fiber's center. In one embodiment, careful control of the applied tension force with time acts to control the velocity of the propagating crack by maintaining substantially constant stress intensity factor. In another embodiment, the applied axial tension force is reduced with time and/or crack growth (as crack propagates). As a result, the strain energy in the fiber material is released by formation of a single plane with an optical quality surface without requiring polishing. More particularly, a substantially flat optical surface or facet of enhanced optical quality is formed at the cleaved end of the optical fiber. The facet surface may be formed at an angle to the longitudinal axis of the fiber by appropriately placing the initial score.

BRIEF DESCRIPTION OF THE DRAWINGS

For a fuller understanding of the nature and advantages of the invention, as well as the preferred mode of use, reference

DETAILED DESCRIPTION OF THE PREFERRED EMBODIMENTS

Figure 1:
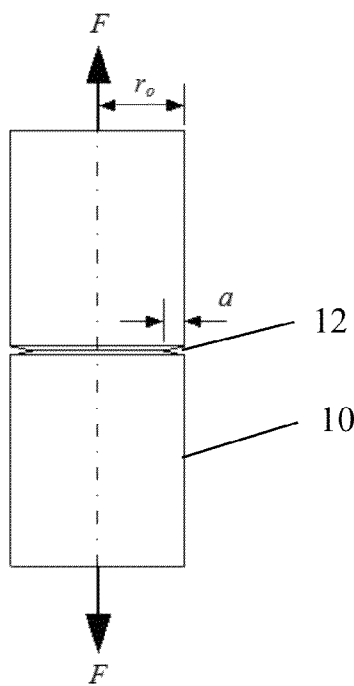
FIG. 1 illustrates optical fiber cleaving using Mode I, in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a process that can be simply and reliably deployed to properly cleave optical fibers to obtain smooth ends, so as to minimize light loss when the fibers are subsequently coupled (e.g., spliced or coupled end-to-end). The process in accordance with the present invention provides an effective, efficient and reliable approach to prepare optical fiber end faces without requiring polishing, which facilitates operations in a factory and could facilitate operations in field environment as well.

In one aspect of the present invention, axial tension applied to the optical fiber (which had been scored to produce an initial surface crack at the intended cleave location) is regulated in a manner in which the stress intensity factor relating to the crack on the fiber is maintained at an acceptable level to produce a stable crack growth at a reasonable rate to cleave the fiber. In another aspect of the present invention, the axial tension is applied in a time-varying manner.

More particularly, in one embodiment of the present invention, the basic approach is to score or scribe a groove into the optical fiber on its outside diameter either fully around the circumference of the fiber or in selective regions around the circumference, and then apply a time-varying force co-axial to the fiber longitudinal axis to cleave the fiber. The fiber may or may not be initially held under a substantially constant tension when it is being scored. The score may be produced mechanically by a scoring tool, or a laser cut, or subjecting to other forms of ablation such as ion beam. A carefully controlled scoring process provides only an initial surface crack having a desired crack depth without sub-surface cracks (i.e., no cracks below the bottom surface of the scored groove), which defines the location where crack propagation across the fiber will be initiated with sufficient axial tension. Specifically, scoring of the groove produces an initial surface crack of a few tens of nanometers, whereby the scoring tool cuts the material of the fiber in a ductile mode instead of a brittle mode, thereby avoiding sub-surface cracks below the bottom of the scored grooves. Shallow depths of cut (below few tens of nanometers) during the scoring process can be achieved by precision feeding of the scoring tool or pressing the tool against the fiber with slight spring force. Applying a time varying force to the fiber causes the initial crack to propagate radially inward towards the fiber's center.

In one embodiment, careful control of the applied tension force with time acts to control the velocity of the propagating crack by maintaining an acceptable stress intensity factor for the crack on the fiber (e.g., a substantially constant stress intensity factor below a critical stress intensity factor under the particular loading mode). As a result, the strain energy in the fiber material is released by formation of a single plane with an optical quality surface without requiring polishing. More particularly, a substantially flat optical surface or facet of enhanced quality is formed at the cleaved end of the optical fiber without requiring polishing. The facet surface may be formed at an angle to the longitudinal axis of the fiber by appropriately placing the initial score (e.g., an elliptic score in a plane at an angle (e.g., 8 degrees) with respect to the longitudinal axis of the fiber).

In another embodiment of the present invention, after an initial ramp up of the applied axial tension force to a level sufficient to initiate crack growth (a peak axial tension in the cleaving process, while maintaining the stress intensity factor for the crack below a critical stress intensity factor), the applied axial tension force is then reduced with time from such peak axial tension, while pulling the ends of the fiber to continue crack growth. From another perspective, after crack propagation is initiated by an initial ramp up of axial tension to a peak axial tension, the applied axial tension force is reduced with further growth in crack depth. In the disclosed embodiments described hereinafter, the applied axial tension force is reduced monotonically, and further decreases at a rate that decreases with time or crack growth. It is noted that the peak axial tension force may be greater than the tension force required to initiate crack growth, and the peak axial tension force may be maintained constant for a brief period as part of the ramp up before the axial tension force is reduced.

While it is not necessary for an understanding of the present invention, the proposed theory in support of the development of the present invention is discussed briefly below.

There are three basic modes of fracture of fiber: Mode I (opening mode), Mode II (sliding mode), and Mode III (tearing mode). For the controlled fracture of optical fibers in the present inventive deterministic fiber cleaving process, Mode I is applied. Referring to FIG. 1, a section of an exemplary optical fiber 10 is shown. For the illustration in FIG. 1, only the bare fiber is shown (i.e., including core and cladding), and the protective polymer coating is omitted. The fiber 10 is cylindrical, having a circular cross-section. The fiber 10 has a core of doped silica, which is coated with a cladding of silica. As illustrated, an external circumferential crack 12 is provided around the optical fiber 10 (i.e., on the surface of the cladding layer) for initiating crack propagation for cleaving using Mode I loading. For example, the circumferential crack with a crack depth of a on the fiber is prepared by scoring or scribing it with a diamond or carbide tip while rotating the fiber about its axis or rotating the tip about the fiber. When one end of the fiber 10 is pulled axially by a time varying pulling force F (i.e., an equal and opposite axial tension force F), while holding the opposite end of the fiber 10, a stable crack growth propagation condition is achieved in which the circumferential crack on the fiber grows radially inward towards the center within the stable crack growth velocities.

The variables and basic equations taken into consideration include the following:

Variables:
$K_I$=Stress intensity factor
$\sigma$=Applied stress
$a$=Crack depth
$a_o$=Initial crack depth
$\alpha$=Multiplying factor F=Applied pulling force
A=Un-fractured area of fiber
$r_o$=Radius of fiber (from cladding surface)
v=Velocity of crack growth
t=Time
C=Fitting parameter
n=Fitting parameter (fatigue constant)

It is noted that the multiplying factor α may be referenced from A. Y. T. Leung and R. K. L. Su, "Two-Level Finite Element Study of Axisymmetric Cracks," *International Journal of Fracture*, 89, 193-203 (1998).

Basic equations:

$$K_I = \sigma\sqrt{\pi a}\,\alpha$$

$$\sigma = F/A$$

$$A = \pi r^2$$

$$r = r_o - a$$

$$\alpha = K_I / (\sigma\sqrt{\pi a})$$
$$= \frac{1}{2}\left(\frac{r_o}{r}\right)^{3/2}\left[1 + \frac{1}{2}\left(\frac{r}{r_o}\right) + \frac{3}{8}\left(\frac{r}{r_o}\right)^2 - 0.363\left(\frac{r}{r_o}\right)^3 + 0.731\left(\frac{r}{r_o}\right)^4\right]$$

$$F = \frac{K_I A}{\alpha\sqrt{\pi a}}$$

$$a(t) = vt + a_o$$

$$\frac{da}{dt} = v = CK_I^n$$

Given that it is desired to maintain an acceptable stress intensity factor for the crack on the fiber as axial force is being applied in order to produce stable crack growth at a reasonable rate to obtain an optical quality surface at the cleaved end, the relationships between applied axial force and crack depth and between applied axial force and time were analyzed. Calculations were conducted for pulling force F as a function crack depth a and time t, for a fiber radius $r_o$=62.5 μm, initial crack depth $a_o$=1 μm, and critical stress intensity factor $K_{IC}$=0.750 MPa-$m^{0.5}$ for a silica optical fiber.

Figure 2:
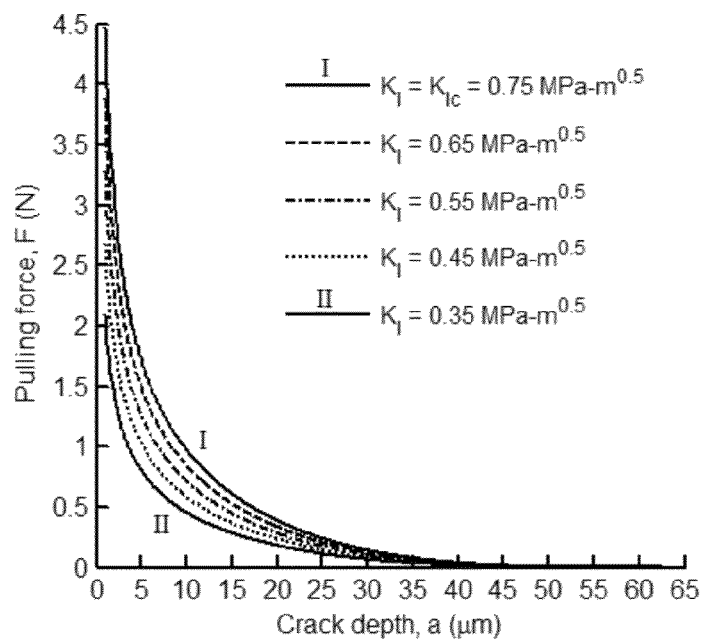
FIG. 2 is a plot of pulling force on silica optical fiber as a function of crack depth.

FIG. 2 is a plot of axial force F as function of crack depth a, at various stress intensity factors $K_I$. The plots at the various stress intensity factors $K_I$ are bounded by curve I (representing $K_{IC}$) on the right and curve II on the left. As illustrated, the stress intensity factors $K_I$ are lower progressively from the curve I at $K_{IC}$, to the curve II. The ramp up to the peak applied force that initiated crack growth leading to the start of each of the curves is not shown in FIG. 2. For each of the curves, after force ramp up that initiated crack growth, the stress intensity factor $K_I$ is maintained substantially constant. For $K_I$ greater than $K_{IC}$=0.750 MPa-$m^{0.5}$ in the region above curve I, crack growth is believed to be unstable. For $K_I$ less than 0.35 MPa-$m^{0.5}$ in the region below curve II, it is believed that significant crack growth will not be produced due to insufficient pulling force to generate sufficient stress intensity factor for the crack on the silica optical fiber to grow at a reasonable rate. Thus, pulling force on the fiber shall be maintained within the region in between curve I and II in order to produce a stable crack growth at a reasonable rate to cleave a fiber. One can appreciate from FIG. 2 that, to maintain the stress intensity factor $K_I$ to be within the boundaries of the curve I and curve II (e.g., at a substantially constant stress intensity factor $K_I$ after the ramp up of the applied force F, the applied force F should be decreased rapidly initially when the crack depth increases initially, and F is reduced relatively slowly when crack depth is large. In one embodiment, the force F may decrease monotonically, and may decrease at a rate that progressively decreases with time.

Figure 3:
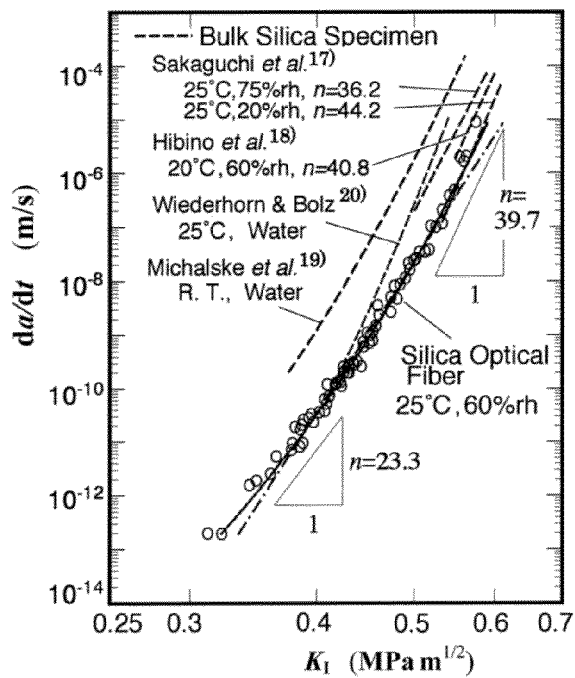
FIG. 3 is a diagram of velocity of crack growth versus stress intensity factor.
Figure 4:
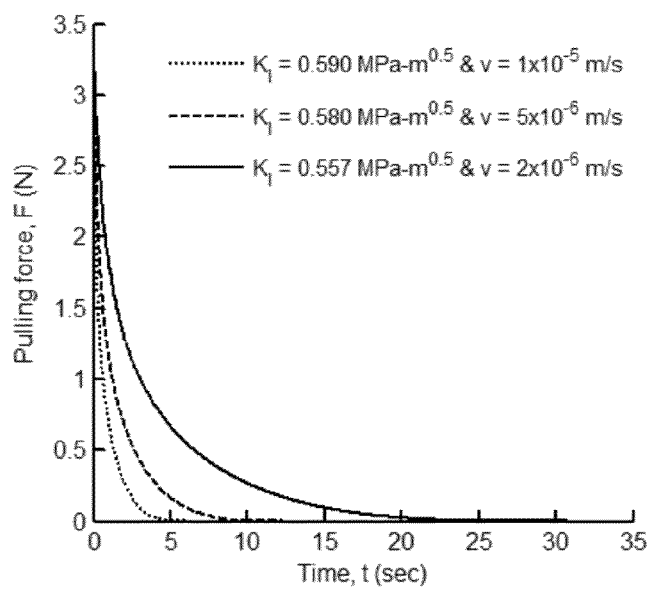
FIG. 4 is a plot of pulling force on the fiber as a function of time.

To consider pulling force F on the fiber as a function of time t, pairs of stable crack growth velocity v and stress intensity factor $K_I$ are selected from FIG. 3, which may be referenced from M. Muraoka and H. Abe, "Subcritical Crack Growth in Silica Optical Fibers in a Wide Range of Crack Velocities," *Journal of the American Ceramic Society*, 79 [1], 51-57 (1996). FIG. 4 shows the axial pulling force on the optical fiber as a function of time for three combination pairs of stable crack growth velocity and stress intensity factor. These pairs are 0.590 MPa-$m^{0.5}$ and $1\times10^{-5}$ m/s, 0.580 MPa-$m^{0.5}$ and $5\times10^{-6}$ m/s, and 0.557 MPa-$m^{0.5}$ and $2\times10^{-6}$ m/s, which give cleaving time of about 6 s, 12.5 s, and 31 s, respectively, for an initial crack depth of 1 μm. The structure of the fiber is the same as for FIG. 2 above, i.e., fiber radius $r_o$=62.5 μm, initial crack depth $a_o$=1 μm and critical stress intensity factor $K_{IC}$=0.750 MPa-$m^{0.5}$.

As illustrated in FIG. 4, the stress intensity factors $K_I$ and the velocity of crack growth v are lower progressively from the curve on the left most to the curve to the right. The force ramp up to the peak applied force that initiated crack growth leading to the start of each of the curves is not shown in FIG. 4. For each of the curves, after the force ramp up, the stress intensity factor $K_I$ and velocity of crack growth v is maintained substantially constant. One can appreciate from FIG. 4 that after the force ramp up, the applied force F should be reduced rapidly with time initially, and F is reduced relatively slowly after a long time. The force F may decreases monotonically, and may decrease at a rate that progressively decreases with crack growth. For stable crack growth in the silica optical fiber, the velocity of crack growth must be kept in between $10^{-15}$ and $10^{-4}$ m/s. To cleave an optical fiber in a reasonable amount of time, the velocity of a crack growth must not be too low (<$10^{-6}$ m/s). For instance, it will take about 1.74 hours to completely cleave a fiber at a crack growth velocity of $10^{-8}$ m/s. Thus, a more reasonable range of crack growth velocity shall be in between $10^{-6}$ and $10^{-4}$ m/s.

It has been found that with careful control of the progressively decreasing axial force to maintain an acceptable stress intensity factor (e.g., a substantially constant stress intensity factor) below the critical stress intensity factor for a stable crack growth, crack growth at a reasonable rate is produced which results in an end surface that is of acceptable optical quality without requiring polishing (hence would facilitate fiber cleaving in field operation environment). The strain energy in the fiber material is released by formation of a single plane with an optical quality surface. In the context of optical fiber, e.g., for optoelectronic applications, an acceptable optical quality surface is a smooth single plane that is extremely flat, having, for example, a maximum variation of less than 500 nm and preferably 100 nm with respect to a nominal plane, and a surface peak-to-valley roughness that is less than 20 nm and preferably 5 nm.

Simulations were conducted based on the foregoing analysis and calculation, with results indicating the inventive cleaving process described above would provide the intended results, namely an end surface having acceptable optical quality for optoelectronic applications without requiring polishing.

Optical fibers may be cleaved with end surfaces orthogonal to the longitudinal axis, or at an angle to the longitudinal axis, based on the principles set forth above, without departing from the scope and spirit of the present invention. For instance, it is possible to score an ellipse about the circumference of the fiber in a plane that is tilted (e.g., by 8 degrees)

with respect to the longitudinal axis of the fiber in order to cleave the end of the fiber at an (e.g., 8-degree) angle.

Figure 5:
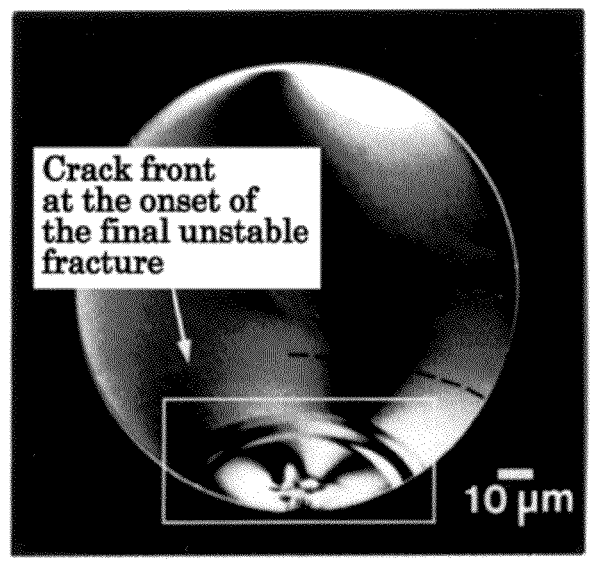
FIG. 5 is a monograph of fractured surface of an optical fiber from a point crack.
Figure 5:
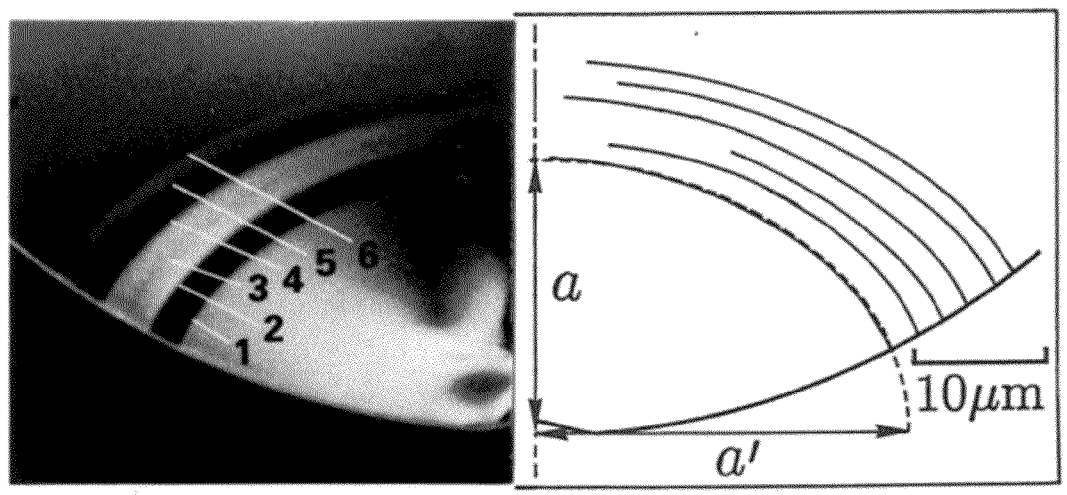

Instead of scoring a continuous circumferential line of initial surface crack as shown in FIG. 1, the inventive process may be implemented using a distribution of a plurality of discrete surface cracks at selected regions about the circumference of the fiber (e.g., a uniform or symmetrical circumferential distribution of point type initial surface cracks). The stress profile created by a point surface crack on a fiber may be referenced to the monograph of the fractured surface (a penny shaped initial crack) of an optical fiber (25° C., 90% rh) shown in FIG. 5, which may be referenced from M. Muraoka, K. Ebata, and H. Abe, "Effect of Humidity on Small-Crack Growth in Silica Optical Fibers," *Journal of the American Ceramic Society*, 76 [6], 1545-1550 (1993).

Further, instead of providing an initial surface crack before tension is applied to the fiber at a level (e.g., the "peak" level referred in the embodiments described above) that initiates crack propagation in the prior embodiments, the fiber may be tensioned at or close to such peak level prior to providing the initial surface crack. According to the present invention, after crack growth is initiated, the applied tension force is regulated in a manner as described above to stay within an acceptable range of stress intensity factor (e.g., at a substantially constant stress intensity factor), crack growth at a reasonable rate is produced which results in an end surface that is of acceptable optical quality without requiring polishing.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A method of cleaving an optical fiber, comprising:
   providing an initial crack at the surface of the optical fiber;
   applying an initial force to initiate crack growth from the initial crack; and
   after crack growth is initiated, applying an axial force to the optical fiber in a time varying manner, wherein the axial force is applied in a manner decreasing with time, to propagate crack growth to cleave the optical fiber.

2. The method of claim 1, wherein the axial force is applied in a monotonically decreasing manner.

3. The method of claim 1, wherein the axial force is applied in a manner decreasing at a rate that decreases with time.

4. The method of claim 2, wherein the axial force is applied in a manner decreasing with crack growth.

5. The method of claim 4, wherein the axial force is applied in a manner decreasing at a rate that progressively decreases with crack growth.

6. The method of claim 5, wherein the axial force is applied to produce a crack growth velocity ranging between $10^{-6}$ and $10^{-4}$ m/s.

7. The method of claim 1, wherein the axial force is applied to produce a stress intensity factor for crack on the fiber which is maintained substantially constant as the axial force is being reduced.

8. The method of claim 1, wherein the axial force is applied to produce a stress intensity factor for crack on the fiber which ranges between 0.750 MPa·m$^{0.5}$ and 0.35 MPa·m$^{0.5}$.

9. The method of claim 1, wherein the axial force is applied in a manner to produce a stable crack growth to obtain a cleaved end surface having an optical quality without requiring polishing.

10. The method of claim 9, wherein the cleave end surface of an optical quality that has a maximum variation of less than 100 nm with respect to a nominal plane, and a surface peak-to-valley roughness that is less than 5 nm.

11. The method of claim 1, wherein the initial crack is circumferential about the optical fiber.

12. The method of claim 1, wherein the initial crack is produced without producing sub-surface crack beyond the initial crack.

13. The method of claim 1, wherein the axial force is applied in tension.

14. A method of cleaving an optical fiber, comprising:
    providing an initial crack at the surface of the optical fiber;
    applying an initial force to initiate crack growth; and
    applying an axial force to the optical fiber in a manner to produce a stable crack growth to obtain a cleaved end surface, wherein the axial force is applied in a time varying manner, and wherein the axial force is applied in a manner decreasing with time.

15. A method of cleaving an optical fiber comprising:
    providing an initial crack at the surface of the optical fiber;
    applying an initial force to initiate crack growth; and
    applying an axial force to the optical fiber in a manner to produce a stable crack growth to obtain a cleaved end surface, wherein the axial force is applied to produce a stress intensity factor for crack on the fiber which is at or below a critical stress intensity factor that produces a stable crack growth.

16. The method of claim 15, wherein the stress intensity factor ranges between 0.750 MPa·m$^{0.5}$ and 0.35 MPa·m$^{0.5}$.

17. The method of claim 14, wherein the axial force is applied in a manner decreasing with crack growth.

18. The method of claim 14, wherein the crack growth is at a rate whereby the end surface has an optical quality without requiring polishing.

19. The method of claim 15, wherein the crack growth is at a rate whereby the end surface has an optical quality without requiring polishing.

20. The method of claim 15, wherein the axial force is applied in a manner decreasing with time.

* * * * *